United States Patent
Qin et al.

(10) Patent No.: US 8,836,807 B2
(45) Date of Patent: Sep. 16, 2014

(54) METHOD FOR READING OUT A HIGH DYNAMIC RANGE IMAGE AND DEVICE USING THE SAME

(75) Inventors: Zhi Qin, Shenzhen (CN); Jingjun Fu, Shenzhen (CN); Wenge Hu, Shenzhen (CN)

(73) Assignee: Byd Company Limited, Shenzhen, Guangdong (CN)

( * ) Notice: Subject to any disclaimer, the term of this patent is extended or adjusted under 35 U.S.C. 154(b) by 753 days.

(21) Appl. No.: 12/972,923

(22) Filed: Dec. 20, 2010

(65) Prior Publication Data

US 2011/0157401 A1 Jun. 30, 2011

(30) Foreign Application Priority Data

Dec. 30, 2009 (CN) .................... 2009 2 0262266 U
Jul. 27, 2010 (CN) .................... 2010 1 0240370

(51) Int. Cl.
*H04N 5/228* (2006.01)
*H04N 5/355* (2011.01)

(52) U.S. Cl.
CPC ................. *H04N 5/35581* (2013.01)
USPC ...................................... 348/222.1

(58) Field of Classification Search
USPC ...................................... 348/222.1
See application file for complete search history.

(56) References Cited

U.S. PATENT DOCUMENTS

| 2006/0011810 A1 | 1/2006 | Ando et al. |
| 2007/0222877 A1 | 9/2007 | Kurane |
| 2010/0007778 A1 | 1/2010 | Lim |

FOREIGN PATENT DOCUMENTS

| CN | 101047786 A | 10/2007 |
| CN | 101060593 A | 10/2007 |
| CN | 101455074 A | 6/2009 |
| CN | 201623774 U | 11/2010 |
| CN | 101957986 A | 1/2011 |
| JP | 2006105707 A | 4/2006 |
| WO | WO 97/17800 A1 | 5/1997 |
| WO | WO 2009/099116 A1 | 8/2009 |
| WO | WO 2011/034578 A1 | 3/2011 |

OTHER PUBLICATIONS

Chen, "Timing Control Circuit Design for CMOS Image Sensor with High Performance and Wide Dynamic Rang," Master Thesis, Tianjin University, Section 3.2, pp. 31-63 (2006).
Wang, "Timing Control Circuit Design for CMOS Image Sensor with High Performance and Wide Dynamic Rang," Master Thesis, Tianjin University, Chapter 3, pp. 14-119 (2005).
Zhou et al., "Design and Implement of Timing Generator of Integral Time Adjustable CCD Camera," *Acta Photonica Sinica*, vol. 37, No. 11, pp. 2300-2304 (2008).
Chinese Search Report dated Jan. 18, 2013, issued in Chinese Patent Application No. 2010102403704.

(Continued)

*Primary Examiner* — Gary C Vieaux
(74) *Attorney, Agent, or Firm* — Finnegan, Henderson, Farabow, Garrett & Dunner, LLP (57) ABSTRACT

A method for reading out a high dynamic range image in an image sensor comprises: resetting a pixel array row by row from an initial row of the pixel array to process a first integration treatment for a first image when reaching a first start time; resetting the pixel array row by row from the initial row of the pixel array to process a second integration treatment for the first image when reaching a second start time; and resetting the pixel array row by row from the initial row of the pixel array to process a first integration treatment for a second image when reaching a third start time.

3 Claims, 7 Drawing Sheets

(56) References Cited

OTHER PUBLICATIONS

European Extended Search Report dated Jul. 2, 2013, issued in European Patent Application No. 10840469.

PCT International Search Report mailed Mar. 10, 2011, issued in International Patent Application No. PCT/CN2010/079357.

PCT Written Opinion of the International Searching Authority mailed Mar. 10, 2011, issued in International Patent Application No. PCT/CN2010/079357.

| Line_counter | Reset_line_address | Short_int_reset_line_address | Double_reset_line_address | Scan_line_address |
|---|---|---|---|---|
| ... | ... | ... | ... | ... |
| 102 | 464 | 458 | 490 | 459 |
| 101 | | | | 457 |
| 100 | 465 | 459 | 0 | 460 |
| 99 | | | | 458 |
| 98 | 466 | 460 | 1 | 461 |
| 97 | | | | 459 |
| ... | ... | ... | ... | ... |

| Line_counter | Reset_line_address | Short_int_reset_line_address | Double_reset_line_address | Scan_line_address |
|---|---|---|---|---|
| ... | ... | ... | ... | ... |
| 2 | | | | 488 |
| 1 | 4 | | | 490 |
| 1020 | | 490 | | 488 |
| 1019 | 5 | | | 0 |
| 1018 | | | 490 | 488 |
| 1017 | 6 | 0 | | 1 |
| 1016 | | | | 488 |
| 1015 | 7 | 1 | | 2 |
| 1014 | | | 0 | 3 |
| 1013 | 8 | 2 | | 1 |
| 1012 | | | 1 | 4 |
| 1011 | 9 | 3 | | 2 |
| ... | ... | ... | ... | ... |

FIG. 7

METHOD FOR READING OUT A HIGH DYNAMIC RANGE IMAGE AND DEVICE USING THE SAME

CROSS-REFERENCE TO RELATED APPLICATION

This application claims foreign priority benefits under 35 U.S.C. §119 of Chinese Patent Application Serial No. 200920262266.8, filed on Dec. 30, 2009, and No. 201010240370.4, filed on Jul. 27, 2010, the contents of which are incorporated herein by reference in its entirety.

TECHNICAL FIELD

Exemplary embodiments of the present disclosure generally relate to an image sensor, and in particular, relate to a method for reading out a high dynamic range image in an image sensor and a device using the same.

BACKGROUND

Nowadays, one method for obtaining a high dynamic range (HDR) image in an image sensor having a pixel array including a plurality of pixels arranged in columns and rows comprises the steps of: exposing all rows of the pixel array for a long time to obtain long exposing information of an image; exposing all rows of the pixel array for a short time to obtain short exposing information of an image; and combining the long exposing information and the short exposing information.

For an image sensor, the exposure procedure is achieved through the following steps: resetting the pixel array row by row from an initial row of the pixel array that will process an integration treatment; and reading out the image data of the pixel array row by row from the initial row of the pixel array after a time cycle. It takes two time cycles to finish reading out the whole image data of a frame of the image.

Figure 1:
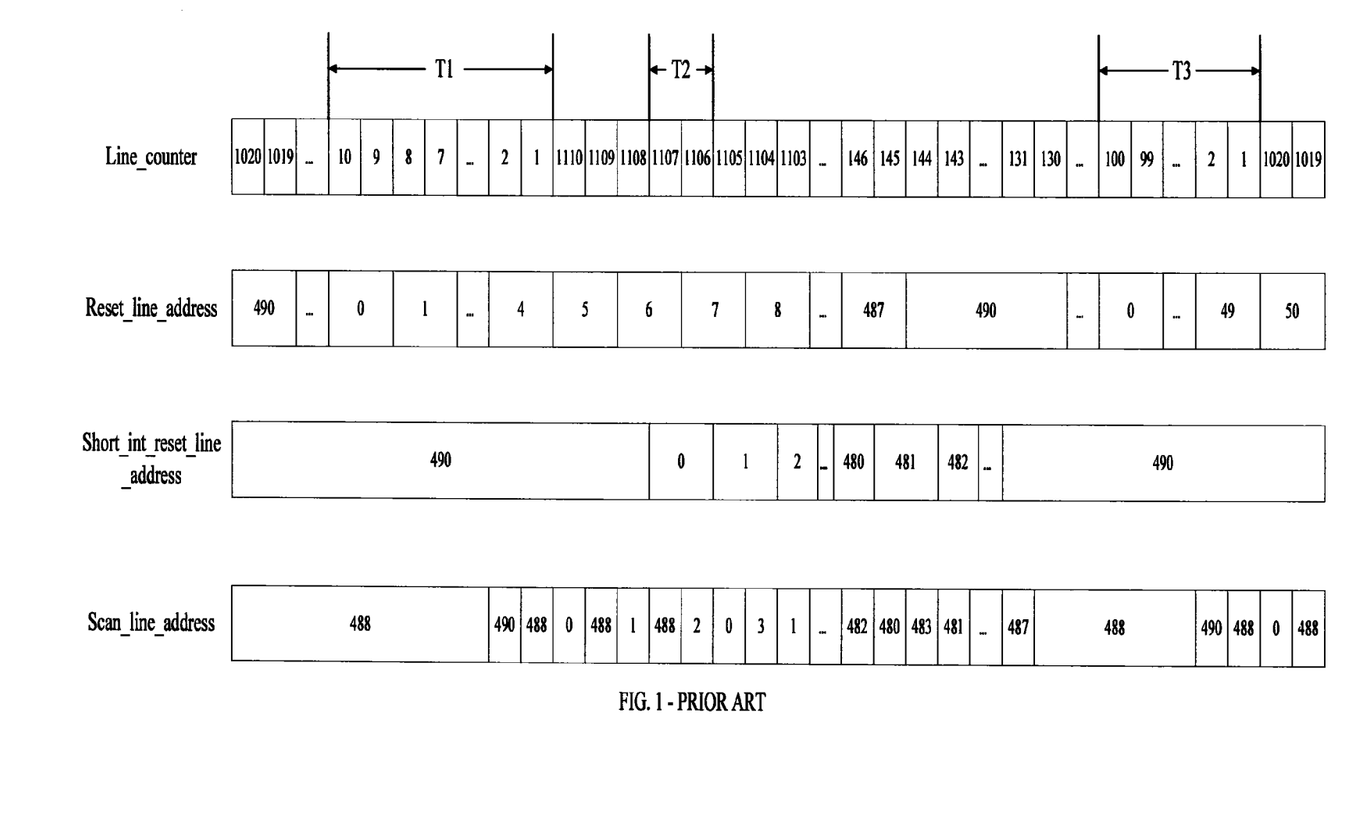
FIG. 1 is a schematic integration sequence diagram of an image in the prior art.

To reduce the time for reading out the image data, a method for outputting a HDR image is provided in the prior art. FIG. 1 shows a sequence diagram of outputting a HDR image in the prior art. The first integration time of the first image is 10 time units, and according to the first integration time the method resets the pixel array row by row from the initial row of the pixel array to process a first integration treatment when the row counting signal reaches Line_counter 10 in a time cycle. The first integration time of the first image is then compared with a first integration time of the second image (100 time units). To avoid two rows being reset to process a first integration treatment at the same time, the frame length is adjusted to 1110 from 1020. As a result, the pixel array won't be reset to process a first integration treatment for the second image until all the valid rows of the pixel array have been reset to process a first integration treatment and a second integration treatment for the first image.

In the prior art, a first integration time of the first image is T1; a second integration time of the first image is T2; a maximum second integration time is M and a first integration time of the second image is T3. In the specific frames, T1 is 10 time units, T2 is 2 time units, M is 5 time units and T3 is 100 time units.

The method resets the pixel array row by row from the initial row of the pixel array to process a first integration treatment for the first image when the row counting signal reaches 10 in a first time cycle. When the row counting signal Line_counter reaches 1110 in a second time cycle, the second integration image data is read out row by row from an initial row of the pixel array. Because the maximum second integration time M is 5, and the second integration time of the first image T2 is 2, the pixel array is reset row by row from an initial row of the pixel array to process a second integration treatment when the row counting signal Line_counter reaches 1107 and the first integration image data is read out row by row from an initial row of the pixel array when the row counting signal Line_counter reaches 1105. The first integration image data or the integration image data in a row is read out in a time unit. When the row counting signal Line_counter reaches an even number, a row in the pixel array is reset to process a first integration treatment and the first integration image data in another row is read out. When the row counting signal Line_counter reaches an odd number, a row in the pixel array is reset to process a second integration treatment and the second integration image data in another row is read out. Finally the pixel array is reset row by row from the initial row of the pixel array to process a first integration treatment for the second image when the row counting signal reaches 100 in the second time cycle.

When the row counting signal Line_counter reaches 1106 in the second time cycle, the first integration image data in row 2 is read out and the row 7 in the pixel array is reset to process a first integration treatment. When the row counting signal Line_counter reaches 1105 in the second time cycle, the second integration image data in row 0 is read out and the row 1 in the pixel array is reset to process a second integration treatment. The pixel array won't be reset to process a first integration treatment for the second image until all the valid rows of the pixel array have been reset to process a first integration treatment and a second integration treatment for the first image. In the reset and read out procedure, the address of the row for reading out the second integration image data of the first image is less than the address of the row being reset to process a second integration treatment; the row being reset to process a second integration treatment is less than the address of the row for reading out the first integration image data of the first image; and the address of the row for reading out the first integration image data of the first image is than the row being reset to process a first integration treatment.

In the prior art, the frame length is adjusted from 1020 to 1110, that is, the frame rate is decreased, which can't satisfy the requirement made by the national television standards committee (NTSC) or the phase alternating line (PAL) that when the image is output the frame rate should be a content. Furthermore, if a high dynamic image needs to be output, the image data, equal to two frame image data in a general mode, should be output in a frame time. The image data of one frame is a first integration image data and the image data of another frame is a second integration image data. To obtain the high dynamic image data by reading out the first integration image data and the second integration image data in turn, all the times for processing the first integration treatment should be with the same parity and all the times for processing the second integration treatment should be with the same parity. So the object to output the high dynamic image data with random first integration time and second integration time can't be achieved in the prior art.

BRIEF SUMMARY

Embodiments consistent with the present disclosure provide a method for reading out a high dynamic range image in an image sensor and a device using the same.

Consistent with an embodiment of the present disclosure, a method for reading out a high dynamic range image in an image sensor including a pixel array including a plurality of pixels arranged in columns and rows, comprises: confirming a first integration time and a second integration time for the pixel array; determining a first start time for resetting an initial row of the pixel array according to a first integration time T1 of a first image; determining a second start time for resetting the initial row of the pixel array according to a second integration time T2 of the first image and a maximum second integration time M; determining a third start time for resetting the initial row of the pixel array according to a first integration time T3 of a second image; resetting the pixel array row by row from the initial row of the pixel array to process a first integration treatment for the first image when reaching the first start time; reading out first integration image data of the first image of the pixel array row by row from the initial row of the pixel array when the initial row has undergone the first integration treatment for the first integration time T1; resetting the pixel array row by row from the initial row of the pixel array to process a second integration treatment for the first image when reaching the second start time; reading out second integration image data of the first image of the pixel array row by row from the initial row of the pixel array when the initial row has undergone the second integration treatment for the second integration time T2; and resetting the pixel array row by row from the initial row of the pixel array to process a first integration treatment for a second image when reaching the third start time, wherein the first integration time T1 is greater than the second integration time T2.

Consistent with an embodiment of the present disclosure, a device for reading out a high dynamic range image comprises: a pixel array including a plurality of pixels arranged in columns and rows; a calculating unit configured to calculate and confirm a first integration time and a second integration time according to output image information; and a first and second integration processing unit configured to: determine a first start time for resetting the initial row of the pixel array according to a first integration time T1 of a first image; determine a second start time for resetting the initial row of the pixel array according to a second integration time T2 of the first image and a maximum second integration time M which is an odd number; determine a third start time for resetting the initial row of the pixel array according to a first integration time T3 of a second image; reset the pixel array row by row from the initial row of the pixel array to process a first integration treatment for the first image when reaching the first start time; read out first integration image data of the first image of the pixel array row by row from the initial row of the pixel array when the initial row has undergone the first integration treatment for the first integration time T1; reset the pixel array row by row from the initial row of the pixel array to process a second integration treatment for the first image when reaching the second start time; read out second integration image data of the first image of the pixel array row by row from the initial row of the pixel array when the initial row has undergone the second integration treatment for the second integration time T2; and reset the pixel array row by row from the initial row of the pixel array to process a first integration treatment for a second image when reaching the third start time.

Consistent with an embodiment of the present disclosure, a method for reading out a high dynamic range image in an image sensor, comprising: resetting a pixel array row by row from an initial row of the pixel array to process a first integration treatment for a first image when reaching a first start time; reading out first integration image data of the first image of the pixel array row by row from the initial row of the pixel array when the initial row has undergone a first integration treatment for a first integration time T1; resetting the pixel array row by row from the initial row of the pixel array to process a second integration treatment for the first image when reaching a second start time; reading out second integration image data of the first image of the pixel array row by row from the initial row of the pixel array when the initial row has undergone the second integration treatment for a second integration time T2; and resetting the pixel array row by row from the initial row of the pixel array to process the first integration treatment for a second image when reaching a third start time.

BRIEF DESCRIPTION OF THE DRAWINGS

The foregoing summary, as well as the following detailed description, will be better understood when read in conjunction with the appended drawings. The embodiments illustrated in the figures of the accompanying drawings herein are by way of example and not by way of limitation. In the drawings.

DETAILED DESCRIPTION

Reference will now be made in detail to exemplary embodiments, examples of which are illustrated in the accompanying drawings. Wherever possible, the same reference numbers will be used throughout the drawings to refer to the same or like parts.

In some embodiments of the present disclosure, a first integration time of the first image is T1; a second integration time of the first image is T2; a maximum second integration time is M; a first integration time of the second image is T3 and an idle time of the first image is T4. The first integration time of the first image T1 is compared with the first integration time of the second image T3, if T1 is less than the frame length of the first image, T3 is greater than T1, and the difference between T3 and T1 is greater than T4, a method for reading out a high dynamic range image in a image sensor may be provided as follow.

Figure 2:
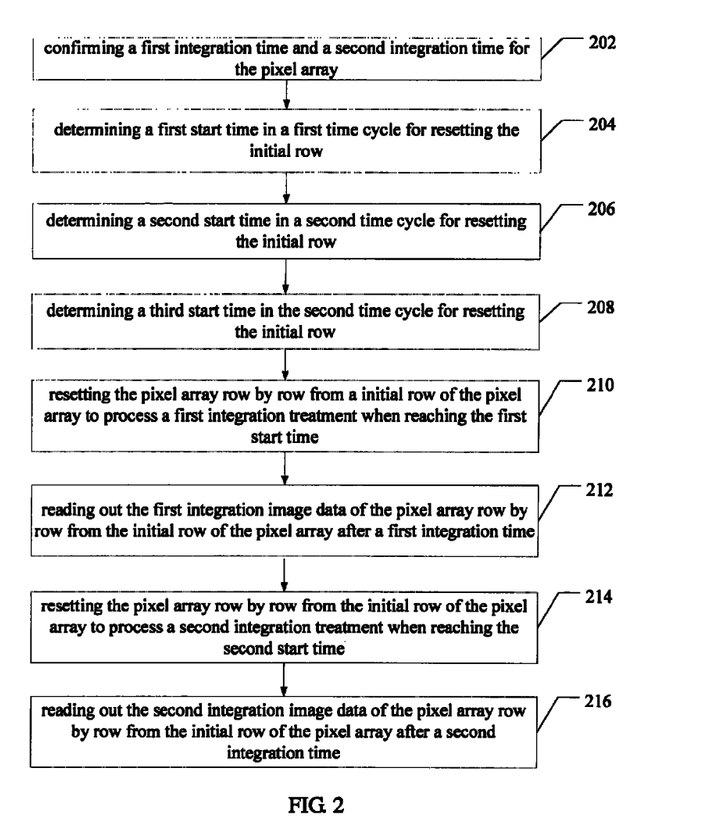
FIG. 2 is a flow chart of a method for reading out a high dynamic range image in an image sensor consistent with embodiments of the present disclosure.

Referring to FIG. 2, a method for reading out a high dynamic range image in an image sensor having a pixel array including a plurality of pixels arranged in columns and rows comprises: confirming a first integration time and a second integration time for the pixel array at step 202; determining a first start time in a first time cycle for resetting the initial row of the pixel array according to a first integration time T1 of the first image at step 204; determining a second start time in a second time cycle for resetting the initial row of the pixel array according to a second integration time T2 of the first image and a maximum second integration time M at step 206; determining a third start time in the second time cycle for resetting the initial row of the pixel array according to a first integration time T3 of the second image at step 208; resetting the pixel array row by row from an initial row of the pixel array to process a first integration treatment for the first image when reaching the first start time at step 210; reading out the first integration image data of the first image of the pixel array row by row from the initial row of the pixel array when the initial row has undergone the first integration treatment for a first integration time at step 212; resetting the pixel array row by row from the initial row of the pixel array to process a second integration treatment for the first image when reaching the second start time at step 214; and reading out the second integration image data of the first image of the pixel array row by row from the initial row of the pixel array when the initial row has undergone the second integration treatment for a second integration time at step 216. In some embodiments, the first integration time is greater than the second integration time. In some embodiments, the method further comprises the step of resetting the pixel array row by row from the initial row of the pixel array to process a first integration treatment for the second image when reaching the third start time.

In some embodiments, if the frame length of the first image is L, the first start time is the value of T1 in the first time cycle, the second start time is the value of the formula L−(M−T2) in the second time cycle, and the third start time is the value of T3 in the second time cycle.

In some embodiments, if the first integration image data of the first image in the row N of the pixel array is read out in the present time unit, the second integration image data of the first image in the row (2N+1−M)/2 of the pixel array may be read out in the next time unit. N is an integer, and the value of (2N+1−M)/2 is an integer.

In some embodiments, when the first integration image data of the first image in the row N of the pixel array is read out in the present time unit, if T1 is an even number, the row (N+T1/2) is reset synchronously to process the first integration treatment for the first image; if T1 is an odd number, the row (N+(T1+1)/2) is reset in the next time unit to process the first integration treatment for the first image. N is an integer, and the value of (N+T1/2) is an integer and the value of (N+(T1+1)/2) is an integer.

In some embodiments, when the first integration image data of the first image in the row N of the pixel array is read out in the present time unit, if T2 is an even number, the row (N−(M−T2−1)/2) is reset in the next time unit to process the second integration treatment for the first image; if T2 is an odd number, the row (N−(M−T2)/2) is reset synchronously to process the second integration treatment for the first image. N is an integer, and the value of (N−(M−T2−1)/2) is an integer and the value of (N−(M−T2)/2) is an integer.

In some embodiments, when the first integration image data in the row N of the pixel array is read out in the present time unit, the low S of the pixel array is reset synchronously or in the next time unit to process the first integration treatment for the second image. S is an integer.

In some embodiments, S is less than or equal to (2N+1−M)/2; (2N+1−M)/2 is less than (N−(M−T2−1)/2) or (N−(M−T2)/2); (N−(M−T2−1)/2) or (N−(M−T2)/2) is less than or equal to N; and N is less than (N+T1/2) or (N+(T1+1)/2). Accordingly, in a unit time, the address (N+T1/2) or (N+(T1+1)/2) of the row reset to undergo the first integration treatment for the first image is greater than the address N of the row for reading out the first integration image data of the first image; the address N of the row for reading out the first integration image data of the first image is greater than or equal to the address (N−(M−T2−1)/2) or (N−(M−T2)/2) of the row reset to undergo the second integration treatment for the first image; the address (N−(M−T2−1)/2) or (N−(M−T2)/2) of the row reset to undergo the second integration treatment for the first image is greater than the address (2N+1−M)/2 of the row for reading out the second integration image data of the first image; and the address (2N+1−M)/2 of the row for reading out the second integration image data of the first image is greater than the address S of the row reset to undergo the first integration treatment for the second image.

In some embodiments, the method further comprises a step of converting the first integration image data and the second integration image data into a first digital image signal and a second digital image signal respectively. In some embodiments, the method further comprises combining the first digital image signal and the second digital image into a combination image data.

In some embodiments, all rows that need to undergo a first integration treatment for an image by the first and second integration processing unit are integrated for the same first integration time T1. All rows that need to undergo a second integration treatment by the first and second integration processing unit are integrated for the same second integration time T2. The first integration time T1 is greater than the second integration time T2. The sequence of the rows for being reset is the same as the sequence of the rows for reading out the image data.

In some embodiments, a valid row in the pixel array is one that needs to be reset or from which the image data is read out, and a vacancy row of the pixel array is one that doesn't have image data read out. In a time cycle, a vacancy row of the pixel array is reset after a valid row of the pixel array has been reset or the image data of the valid row of the pixel array has been read out. The vacancy row is reset to drain the integration charge in the vacancy row to avoid affecting the valid row adjacent to the vacancy row.

In some embodiments, the valid rows comprise nonadjacent rows. In some embodiments, the valid rows comprise adjacent rows.

According to a method in some embodiments, the first start time, the second time and the third time may be determined according to the first integration time T1, the second integration time T2 and the maximum second integration time M. The pixel array may process an integration treatment with a content length and the pixel array may be completely reset to process an integration treatment for the first image and the second image no matter what the difference between the first integration time T3 of the second image and the first integration time T1 of the first image is and regardless of whether the first integration time T1, the second integration time T2 and the first integration time T3 are an odd number or an even number. So the image may be output correctly with a content frame rate.

Figure 3:
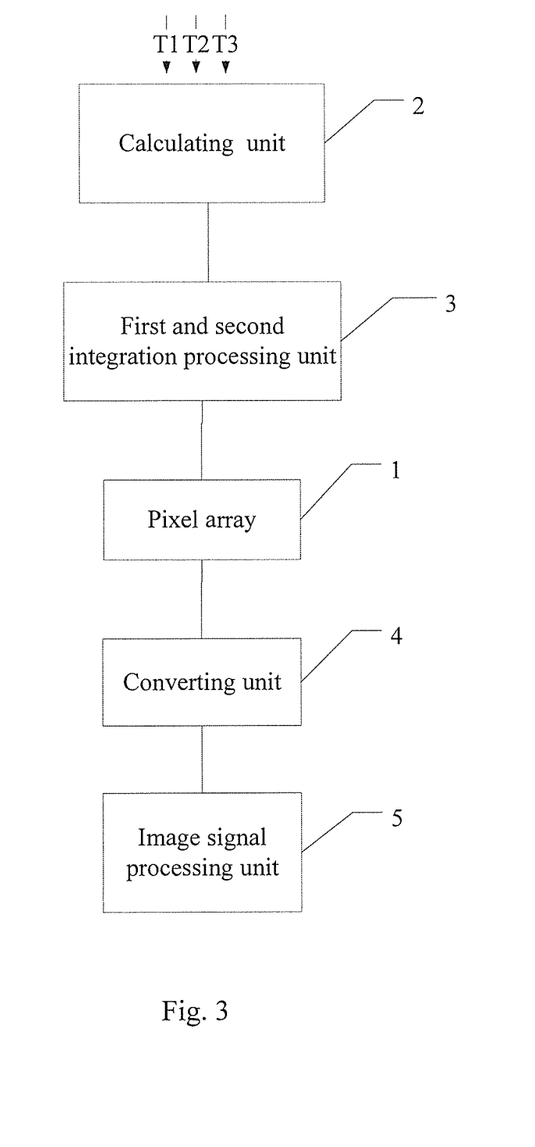
FIG. 3 is a schematic integration sequence diagram for reading out a high dynamic range image consistent with embodiments of the present disclosure.

In some embodiments, a device for reading out a high dynamic range image is provided. Referring to FIG. 3, the device comprises: a pixel array 1 comprising a plurality of pixels arranged in columns and rows; a calculating unit 2, configured to calculate and confirm a first integration time and a second integration time according to output image information; and a first and second integration processing unit 3, configured to: determine a first start time in a first time cycle for resetting the initial row of the pixel array according to a first integration time T1 of the first image; determine a second start time in a second time cycle for resetting the initial row of the pixel array according to a second integration time T2 of the first image and a maximum second integration time M which is an odd number; determine a third start time in the second time cycle for resetting the initial row of the pixel array 1 according to a first integration time T3 of the second image; reset the pixel array 1 row by row from a initial row of the pixel array to process a first integration treatment for the first image when reaching the first start time; read out the first integration image data of the first image of the pixel array 1 row by row from the initial row of the pixel array 1 when the initial row has undergone the first integration treatment for a first integration time; reset the pixel array 1 row by row from the initial row of the pixel array 1 to process a second integration treatment for the first image when reaching the second start time; read out the second integration image data of the first image of the pixel array 1 row by row from the initial row of the pixel array when the initial row has undergone the second integration treatment for a second integration time; and reset the pixel array 1 row by row from the initial row of the pixel array 1 to process a first integration treatment for the second image when reaching the third start time.

In some embodiments, the device further comprises a converting unit 4, configured to convert the first integration image data and the second integration image data into a first digital image signal and a second digital image signal respectively; and an image signal processing unit 5, configured to combine the first digital image signal and the second digital image into a combination image data. In some embodiments, M is an odd number.

In some embodiments, when the first integration image data of the first image in the row N of the pixel array 1 is read out in the present time unit by the first and second integration processing unit 3, the second integration image data of the first image in the row (2N+1−M)/2 of the pixel array 1 may be read out by the first and second integration processing unit 3 in the next time unit. N is an integer, and the value of (2N+1−M)/2 is an integer.

In some embodiments, when the first integration image data of the first image in the row N of the pixel array 1 is read out in the present time unit by the first and second integration processing unit, if T1 is an even number, the row (N+T1/2) is reset synchronously by the first and second integration processing unit 3 to process the first integration treatment for the first image; if T1 is an odd number, the row (N+(T1+1)/2) is reset by the first and second integration processing unit 3 in the next time unit to process the first integration treatment for the first image. N is an integer, and the value of (N+T1/2) is an integer and the value of (N+(T1+1)/2) is an integer.

In some embodiments, when the first integration image data in the row N of the pixel array 1 is read out in the present time unit by the first and second integration processing unit 3, if T2 is an even number, the row (N−(M−T2−1)/2) is reset by the first and second integration processing unit 3 in the next time unit to process the second integration treatment; if T2 is an odd number, the row (N−(M−T2)/2) is reset synchronously by the first and second integration processing unit 3 to process the second integration treatment. N is an integer, and the value of (N−(M−T2−1)/2) is an integer and the value of (N−(M−T2)/2) is an integer.

In some embodiments, when the first integration image data in the row N of the pixel array 1 is read out in the present time unit by the first and second integration processing unit 3, the low S of the pixel array 1 is reset synchronously or in the next time unit by the first and second integration processing unit 3 to process the first integration treatment for the second image. S is an integer.

In some embodiments, S is less than or equal to (2N+1−M)/2; (2N+1−M)/2 is less than (N−(M−T2−1)/2) or (N−(M−T2)/2); (N−(M−T2−1)/2) or (N−(M−T2)/2) is less than or equal to N; and N is less than (N+T1/2) or (N+(T1+1)/2). This means that in a unit time, the address (N+T1/2) or (N+(T1+1)/2) of the row reset to undergo the first integration treatment for the first image is greater than the address N of the row from which is read out the first integration image data of the first image; the address N of the row from which is read out the first integration image data of the first image is greater than or equal to the address (N−(M−T2−1)/2) or (N−(M−T2)/2) of the row reset to process the second integration treatment for the first image; the address (N−(M−T2−1)/2) or (N−(M−T2)/2) of the row reset to process the second integration treatment for the first image is greater than the address (2N+1−M)/2 of the row from which is read out the second integration image data of the first image; and the address (2N+1−M)/2 of the row from which is read out the second integration image data of the first image is greater than the address S of the row reset to process the first integration treatment for the second image.

In some embodiments, all rows that need to be subjected to a first integration treatment for an image by the first and second integration processing unit 3 are integrated for the same first integration time T1. All rows that need to be subjected to a second integration treatment by the first and second integration processing unit 3 are integrated for the same second integration time T2. The first integration time T1 is greater than the second integration time T2. The sequence of the rows for being reset is the same as the sequence of the rows for reading out the image data.

In some embodiments, a valid row in the pixel array is the one that needs to reset or read out the image data, and a vacancy row of the pixel array is the one that doesn't need to read out the image data. In a time cycle, a vacancy row of the pixel array is reset after a valid row of the pixel array 1 has been reset or the image data of the valid row of the pixel array 1 has been read out. The vacancy row is reset to drain the integration charge in the vacancy row to avoid affecting the valid row adjacent to the vacancy row.

In some embodiments, the valid rows comprise the nonadjacent rows. In some embodiments, the valid rows comprise the adjacent rows.

Referring to FIG. 4, FIG. 5, FIG. 6, and FIG. 7, some embodiments of the present disclosure are provided. In FIG. 4, FIG. 5, FIG. 6, and FIG. 7, the Line_counter is a row counting signal, the Reset_line_address is the address of the row being subjected to a first integration treatment for the first image, the Short_int_reset_line_address is the address of the row being subjected to a second integration treatment for the first image, the Double_reset_line_address is the address of the row being subjected to a first integration treatment for the second image, and the Scan_line_address is the address of the row from which is being read out the first integration image.

Figure 4:
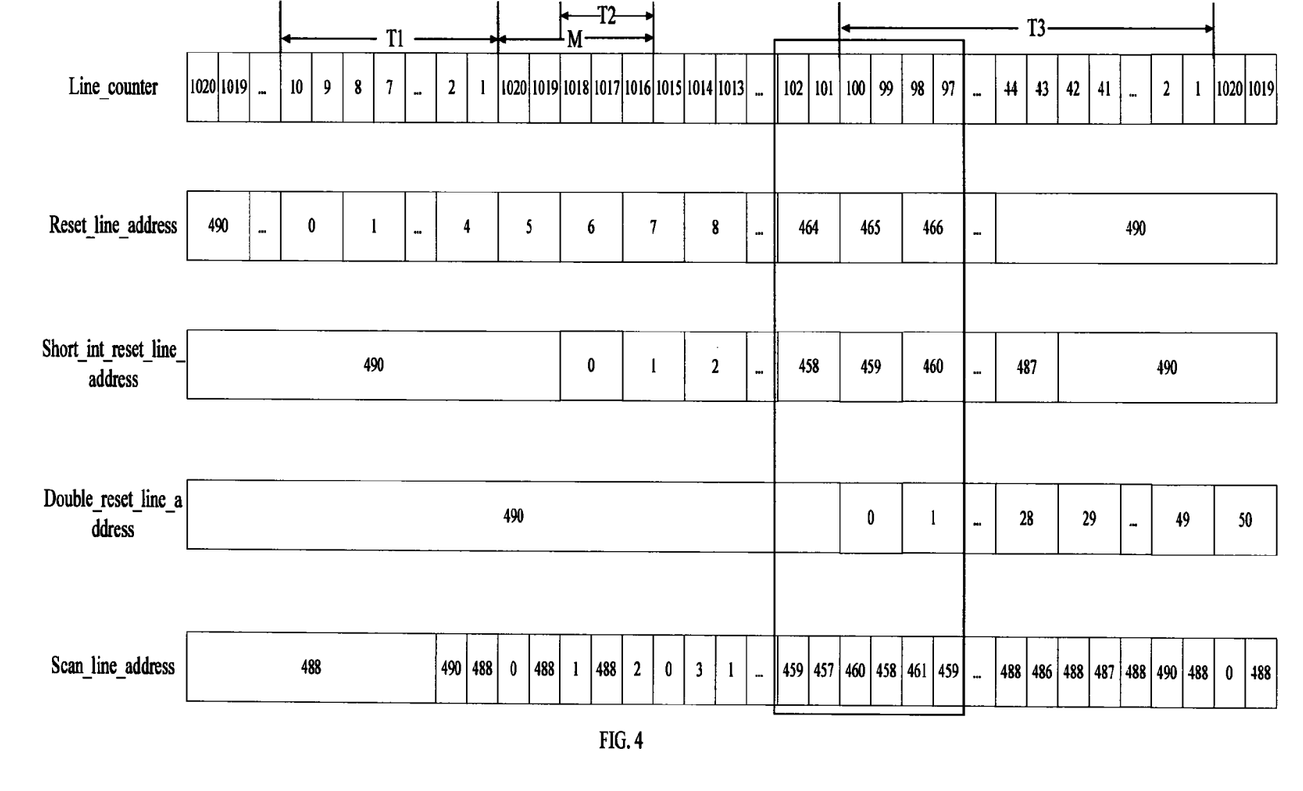
FIG. 4 is a schematic integration sequence diagram for reading out a high dynamic range image consistent with embodiments of the present disclosure.

FIG. 4 is a schematic integration sequence diagram for reading out a high dynamic range image in some embodiments consistent with the present disclosure. In this embodiment, the first integration time of the first image T1 is 10 time units, the second integration time of the first image T2 is 3 time units, the maximum second integration time M is 5 time units and the first integration time of the second image T3 is 100 time units. The invalid time of the first image is 44 time units. The first integration time of the first image T1 is less than the frame length 1020 of the first image. The first integration time of the first image T1 and the first integration time of the second image T3 are compared. Because T1 is less than T3, the difference between T3 and T1 is greater than the invalid time of the first image, and the values of T1 and T3 are even numbers, two rows are reset to process a first integration treatment for the first image and the second image respectively at the same time if the frame length of the images are not changed. Furthermore, two rows are reset to process a first integration treatment for the first image and a second integration treatment for the first image respectively at the same time and two rows are reset to process a second integration treatment for the first image and a first integration treatment for the second image respectively at the same time. For example, when the row counting signal Line_counter reaches 100 in the second time cycle, the row 465 is reset to process a first integration treatment for the first image, the row 458 is reset to process a second integration treatment for the first image, and the row 0 is reset to process a first integration treatment for the second image.

In this embodiment, according to T1, T2, T3 and M, the first start time is 10 in the first time cycle, the second start time is 1020-(5-3) in the second time cycle, and the third start time is 100 in the second time cycle. When the row counting signal Line_counter reaches 10 in the first time cycle, the pixel array is reset row by row from row 0 of the pixel array to process a first integration treatment for the first image. After the first integration time of the first image has passed, that is, when the row counting signal Line_counter reaches 1020 in the second time cycle, the first integration image data of the first image of the pixel array is read out row by row from row 0 of the pixel array. When the row counting signal Line_counter reaches 1018 in the second time cycle, the pixel array is reset row by row from the row 0 to process a second integration treatment. After the second integration time of the first image has passed, that is, when the row counting signal Line_counter reaches 1015 in the second time cycle, the second integration image data of the first image of the pixel array is read out row by row from row 0 of the pixel array. When the row counting signal Line_counter reaches 100 in the second time cycle, the pixel array is reset row by row from row 0 of the pixel array to process a first integration treatment for the second image.

Figure 5:
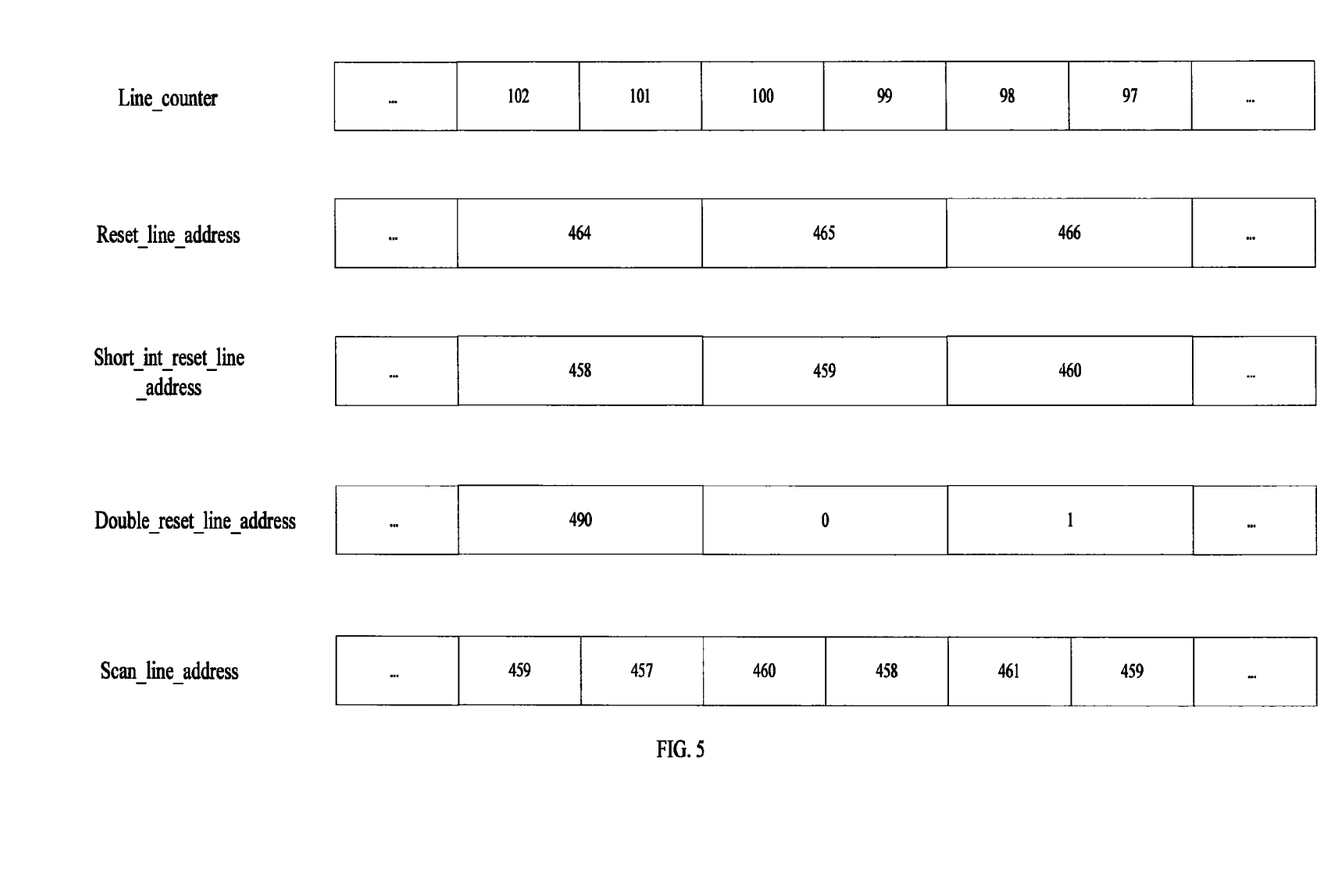
FIG. 5 is a partial enlarged diagram of FIG. 4.

Referring to FIG. 5, which is an enlargement of the delineated portion of FIG. 4, when the row counting signal Line_counter reaches 100 in the second time cycle, the first image data of the first image in row 460 is read out, the row 465 is reset to process a first integration treatment for the first image, the row 459 is reset to process a second integration treatment for the first image, and the row 0 is reset to process a first integration treatment for the second image; when the row counting signal Line_counter reaches 99 in the second time cycle, the second image data of the first image in row 458 is read out.

When the pixel array is reset or the image data is read out, when the row counting signal Line_counter reaches 100, the address of the row 0 reset to process the first integration treatment for the second image is less than the address of the row 458 for reading out the second integration image data of the first image; the address of the row 458 for reading out the second integration image data of the first image is less than the address of the row 459 reset to process the second integration treatment for the first image; the address of the row 459 reset to process the second integration treatment for the first image is less than the address of the row 460 for reading out the first integration image data of the first image; and the address of the row 460 for reading out the first integration image data of the first image is less than the address of the row 465 reset to process the first integration treatment for the first image.

Figure 6:
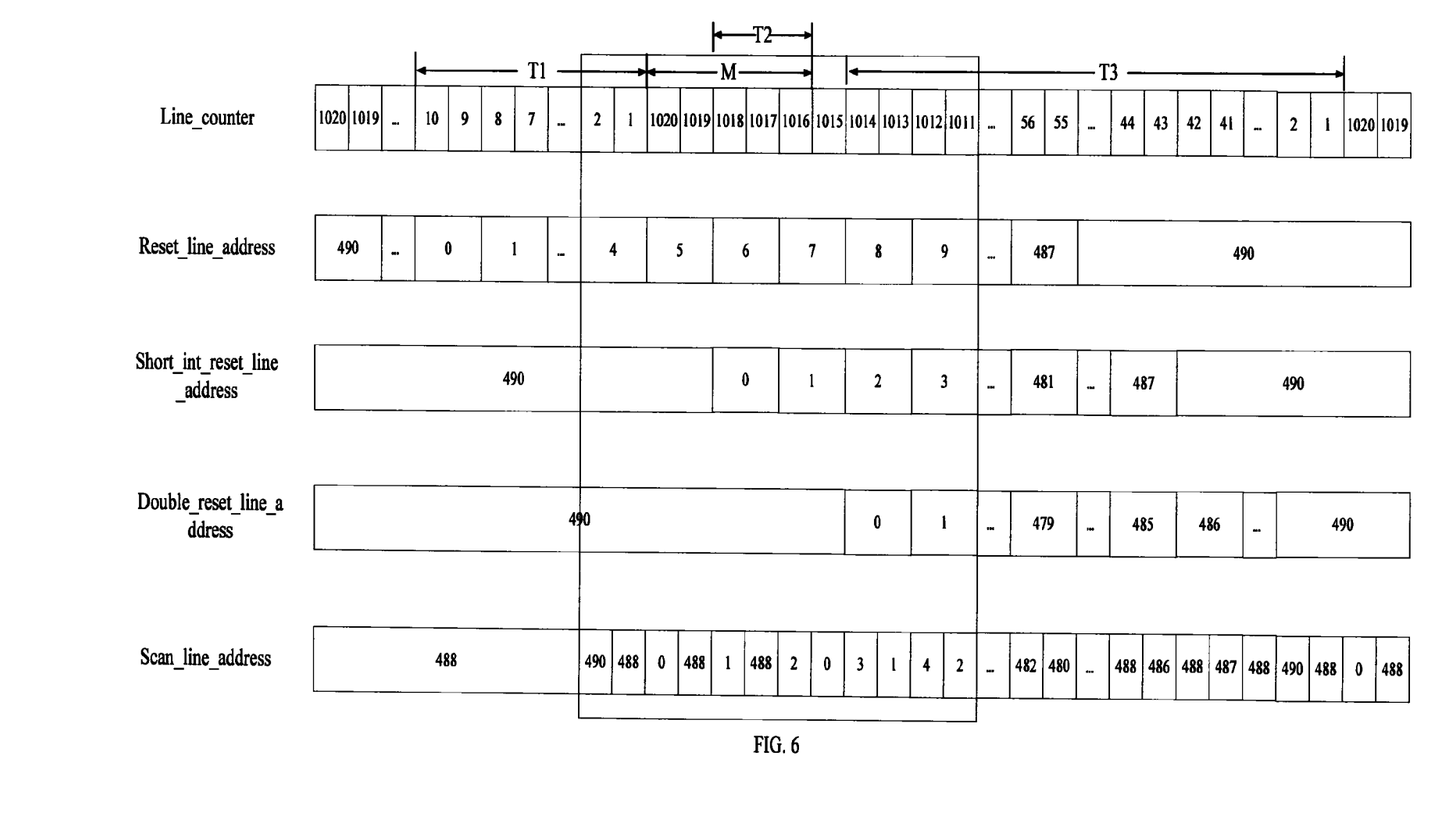
FIG. 6 is a schematic integration sequence diagram for reading out a high dynamic range image consistent with embodiments of the present disclosure.

FIG. 6 is a schematic integration sequence diagram for reading out a high dynamic range image in some embodiments. As shown in FIG. 6, the first integration time of the first image T1 is 10 time units, the second integration time of the first image T2 is 3 time units, the maximum second integration time M is 5 time units and the first integration time of the second image T3 is 1014 time units. The invalid time of the first image is 44 time units. The first integration time of the first image T1 is less than the frame length 1020 of the first image. The first integration time of the first image T1 is compared with the first integration time of the second image T3. Because T1 is less than T3, the difference between T3 and T1 is greater than the invalid time of the first image, and the value of T1 and T3 are even number, two rows are reset to process a first integration treatment for the first image and the second image respectively at the same time if the frame length of the images are not changed. Furthermore, two rows are reset to process a first integration treatment for the first image and a second integration treatment for the first image respectively at the same time and two rows are reset to process a second integration treatment for the first image and a first integration treatment for the second image respectively at the same time. For example, when the row counting signal Line_counter reaches 1014 in the second time cycle, the row 8 is reset to process a first integration treatment for the first image, the row 2 is reset to process a second integration treatment for the first image, and the row 0 is reset to process a first integration treatment for the second image.

In this embodiment, according to T1, T2, T3 and M, the first start time is 10 in the first time cycle, the second start time is 1020-(5-3) in the second time cycle, and the third start time is 100 in the second time cycle. When the row counting signal Line_counter reaches 10 in the first time cycle, the pixel array is reset row by row from row 0 of the pixel array to process a first integration treatment for the first image. After the first integration time of the first image has passed, that is, when the row counting signal Line_counter reaches 1020 in the second time cycle, the first integration image data of the first image of the pixel array is read out row by row from row 0 of the pixel array. When the row counting signal Line_counter reaches 1018 in the second time cycle, the pixel array is reset row by row from the row 0 to process a second integration treatment. After the second integration time of the first image has passed, that is, when the row counting signal Line_counter reaches 1015 in the second time cycle, the second integration image data of the first image of the pixel array is read out row by row from row 0 of the pixel array. When the row counting signal Line_counter reaches 1014 in the second time cycle, the pixel array is reset row by row from row 0 of the pixel array to process a first integration treatment for the second image.

Figure 7:
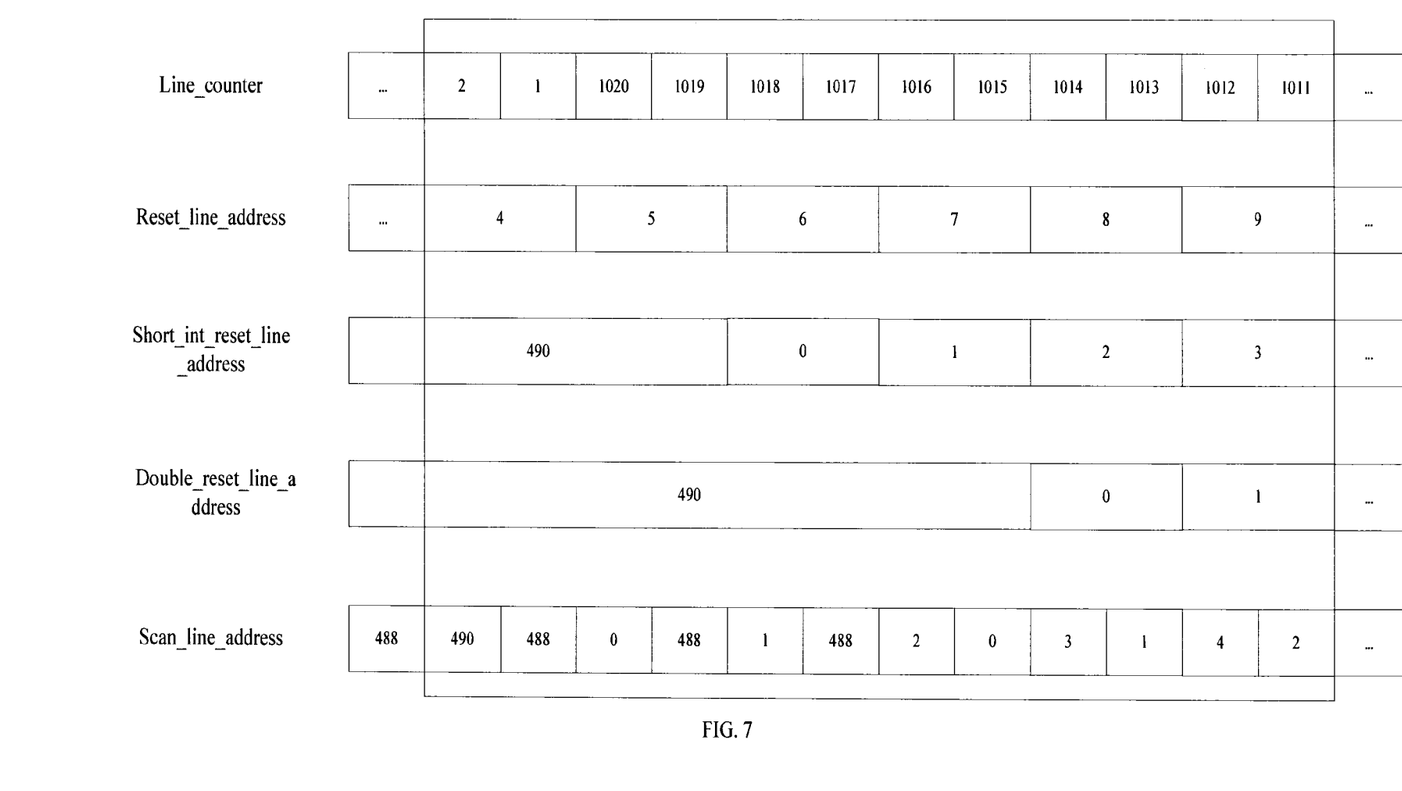
FIG. 7 is a partial enlarged diagram of FIG. 6.

Referring to FIG. 7, which is an enlargement of the delineated portion of FIG. 6, when the row counting signal Line_counter reaches 1014 in the second time cycle, the first image data of the first image in row 3 is read out, the row 8 is reset to process a first integration treatment for the first image, the row 2 is reset to process a second integration treatment for the first image, and the row 0 is reset to process a first integration treatment for the second image; when the row counting signal Line_counter reaches 1013 in the second time cycle, the second integration image data of the first image in row 1 is read out.

When the pixel array is reset or the image data is read out, when the row counting signal Line_counter reaches 1014, the address of the row 0 reset to process the first integration treatment for the second image is less than the address of the row 1 for reading out the second integration image data of the first image; the address of the row 1 for reading out the second integration image data of the first image is less than the address of the row 2 reset to process the second integration treatment for the first image; the address of the row 2 reset to process the second integration treatment for the first image is less than the address of the row 3 for reading out the first integration image data of the first image; and the address of the row 3 for reading out the first integration image data of the first image is less than the address of the row 8 reset to process the first integration treatment for the first image.

It will be appreciated by those skilled in the art that changes could be made to the examples described above without departing from the broad inventive concept. It is understood, therefore, that this invention is not limited to the particular examples disclosed, but it is intended to cover modifications within the spirit and scope of the present invention as defined by the appended claims.

What is claimed is:

1. A method for reading out a high dynamic range image in an image sensor including a pixel array including a plurality of pixels arranged in columns and rows, comprising:
    confirming a first integration time and a second integration time for the pixel array;
    determining a first start time for resetting an initial row of the pixel array according to a first integration time T1 of a first image;
    determining a second start time for resetting the initial row of the pixel array according to a second integration time T2 of the first image and a maximum second integration time M;
    determining a third start time for resetting the initial row of the pixel array according to a first integration time T3 of a second image;
    resetting the pixel array row by row from the initial row of the pixel array to process a first integration treatment for the first image when reaching the first start time;
    reading out first integration image data of the first image of the pixel array row by row from the initial row of the pixel array when the initial row has undergone the first integration treatment for the first integration time T1;
    resetting the pixel array row by row from the initial row of the pixel array to process a second integration treatment for the first image when reaching the second start time;
    reading out second integration image data of the first image of the pixel array row by row from the initial row of the pixel array when the initial row has undergone the second integration treatment for the second integration time T2; and
    resetting the pixel array row by row from the initial row of the pixel array to process a first integration treatment for a second image when reaching the third start time;
    wherein the first integration time T1 is greater than the second integration time T2.

2. A device for reading out a high dynamic range image, comprising:
    a pixel array including a plurality of pixels arranged in columns and rows;
    a calculating unit configured to calculate and determine a first integration time and a second integration time according to output image information; and
    a first and second integration processing unit, configured to:
        determine a first start time for resetting an initial row of the pixel array according to a first integration time T1 of a first image;
        determine a second start time for resetting the initial row of the pixel array according to a second integration time T2 of the first image and a maximum second integration time M which is a odd number;
        determine a third start time for resetting the initial row of the pixel array according to a first integration time T3 of a second image;
        reset the pixel array row by row from the initial row of the pixel array to process a first integration treatment for the first image when reaching the first start time;
        read out first integration image data of the first image of the pixel array row by row from the initial row of the pixel array when the initial row has undergone the first integration treatment for the first integration time T1;
        reset the pixel array row by row from the initial row of the pixel array to process a second integration treatment for the first image when reaching the second start time;
        read out second integration image data of the first image of the pixel array row by row from the initial row of the pixel array when the initial row has undergone the second integration treatment for a second integration time T2; and
        reset the pixel array row by row from the initial row of the pixel array to process a first integration treatment for a second image when reaching the third start time;
    wherein the first integration time T1 is greater than the second integration time T2.

3. A method for reading out a high dynamic range image in an image sensor, comprising:
    resetting a pixel array row by row from an initial row of the pixel array to process a first integration treatment for a first image when reaching a first start time;
    reading out first integration image data of the first image of the pixel array row by row from the initial row of the pixel array when the initial row has undergone a first integration treatment for a first integration time T1;
    resetting the pixel array row by row from the initial row of the pixel array to process a second integration treatment for the first image when reaching a second start time;
    reading out second integration image data of the first image of the pixel array row by row from the initial row of the pixel array when the initial row has undergone the second integration treatment for a second integration time T2; and
    resetting the pixel array row by row from the initial row of the pixel array to process the first integration treatment for a second image when reaching a third start time.

* * * * *